United States Patent Office 3,494,139
Patented Feb. 10, 1970

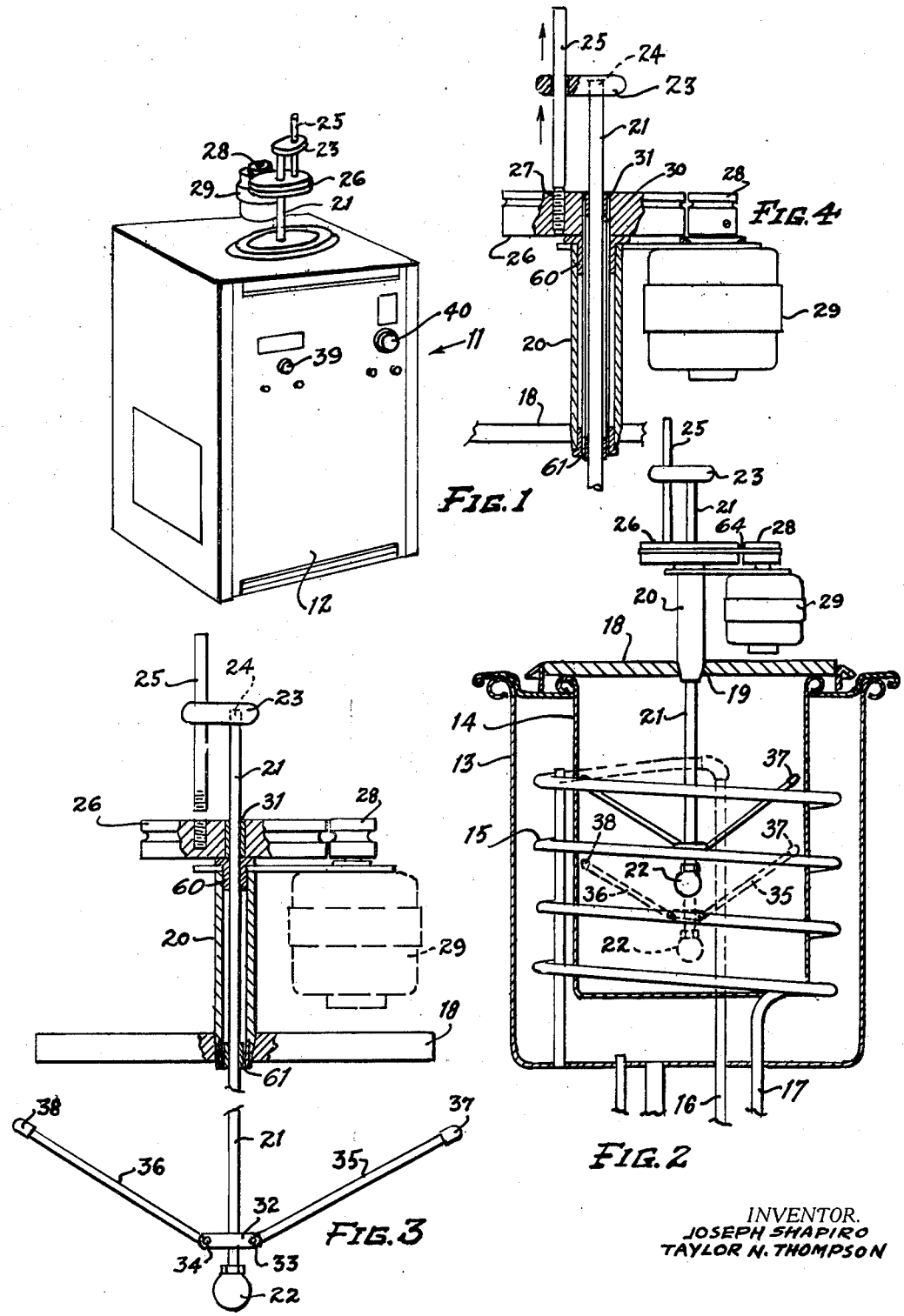

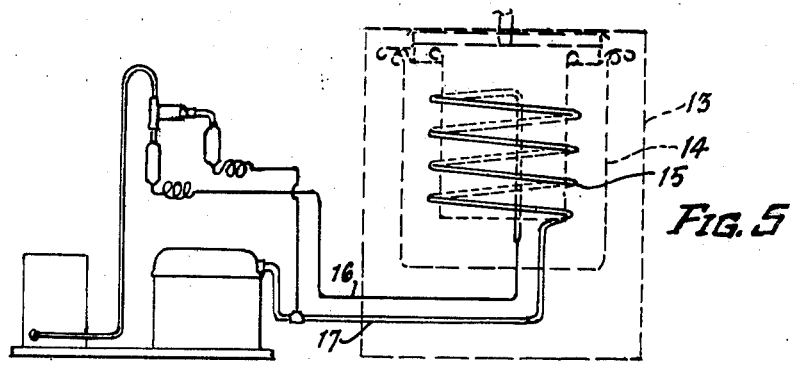
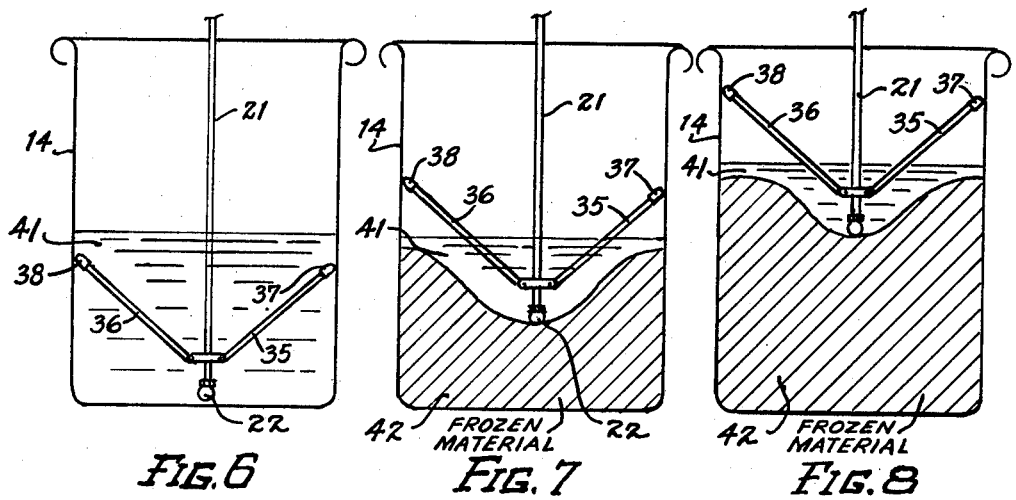

3,494,139
FREEZE CONCENTRATOR
Joseph Shapiro, St. Paul, Minn., and Taylor N. Thompson, New Paltz, N.Y., assignors to The Virtis Company, Inc., Gardiner, N.Y., a corporation of New York
Filed Jan. 23, 1967, Ser. No. 610,852
Int. Cl. B01d 9/04
U.S. Cl. 62—123   3 Claims

ABSTRACT OF THE DISCLOSURE

A freeze concentrator is shown having a container which is surrounded by a freezing coil. An agitator is rotatably movable within the container and has a pair of pivotally movable outwardly extending arms which abut the side of the container. As the liquid within the container is frozen the agitator is moved upwardly until the bulk of the liquid is frozen and within the block of frozen liquid there is a cavity filled with liquid which contains the concentrated liquid.

A method of freeze concentration of a liquid having dissolved solids therewithin which includes the steps of placing the liquid within a container which has a cooling coil thereabout. The cooling coil must have sufficient power to partially freeze the liquid. A rotatable stirrer which can also be moved upwardly is put within the container; the stirrer also having outwardly extending arms which abut the side walls of the container. The cooling coil is actuated and the stirrer is rotated until the liquid within the container is partially frozen but the unfrozen concentrated liquid is disposed within a cavity in the upper portion of the block of frozen liquid.

DESCRIPTION OF THE INVENTION

The instant invention may be briefly described as comprising an apparatus and a method. The apparatus consists of a freeze concentrator unit which comprises a container, freezing means operatively connected with the container, and stirring means within the container. In the preferred modification of the apparatus the freezing means consists of a freezing coil which is connected to a mechanical refrigeration system and surrounds the container. The stirring means consists of a rotatable stirring rod which is upwardly movable.

The method of this invention may be briefly described as comprising the steps of taking a liquid having dissolved solids therein and placing this liquid within a container. Cooling means are put in operative relationship with the walls of the container which cooling means have sufficient power to partially freeze the liquid. Rotatable and upwardly and inwardly movable stirring means are placed within the container. The liquid is then partially frozen until a solid block of frozen material is formed with the unfrozen concentrated liquid within the upper portion of the block.

The above constitutes a brief description of the instant invention and some of the objects and advantages thereof. Other objects and advantages of this invention will become apparent to the reader of this specification as the description proceeds.

The invention will be further described by reference to the accompanying drawings which are made a part of this specification.

FIG. 1 is a perspective view of a freeze concentrator unit made in accordance with this invention.

FIG. 2 is a front view, partly in cross-section, showing the freezing coil surrounding the container and associated structure.

FIG. 3 is a detail view, partly in section, of the stirring means within the container and associated structure.

FIG. 4 is a fragmentary view similar to that set forth in FIG. 3 showing details of the manner in which the stirring means are raised during the operation of this invention.

FIG. 5 is a somewhat diagrammatic view showing the operative relationship between the freezing coil and a source of mechanical refrigeration.

FIGS. 6, 7 and 8 are successive views showing the manner in which the liquid freezes and the dissolved material is concentrated into a relatively small area.

The invention will now be further described by reference to the specific form thereof shown in the accompanying drawings. In this connection, however, the reader is cautioned to note that the specific form of this invention as shown herein is for illustrative purposes and for purposes of example only. Various changes and modifications may obviously be made within the spirit and scope of this invention.

Now referring to the specific form of this invention for a detailed description thereof, the freeze concentrator unit 11 of this invention is formed with a housing 12. Within housing 12 is an outer container 13 and an inner container 14. Surrounding inner container 14 is a freezing coil which is connected to a conduit 16 and to a conduit 17 which in turn are connected to a refrigeration system diagrammatically shown in FIG. 5. This system can be a mechanical refrigeration system, a tank of liquid nitrogen or other cooling means.

Overlying container 14 is cover 18 which is provided with a hole 19 therewithin. Fixedly disposed within hole 19 is sleeve 20 having bearings 60 and 61 at opposite ends which may be formed of any suitable material. Passing through sleeve 20 and supported in the bearings 60 and 61 for rotational and reciprocating movement is stirrer 21 having a probe or supporting knob means 22 at its lower end. Stirrer 21 is connected to wheel 23 at its upper end 24. Slidably connected to wheel 23 is rod 25 which is threadedly connected to pulley 26 by threaded connection 27. Pulley 26 joins pulley 28 through a belt 64 (not shown in FIGS. 3 and 4). Pulley 28 is connected to the rotating shaft (not shown) of motor 29. Pulley 26 is also provided with a recess 30 and a bearing 31 which abuts member 21.

Secured to member 21 is a transverse rod 32 having pins 33 and 34 in opposite ends thereof. A plurality of laterally extending inwardly movable arms 35 and 36 are secured to shaft 32 by pins 33 and 34 respectively. Arms 35 and 36 terminate in bumpers 37 and 38.

The operation of the apparatus is controlled by main switch 39 and a speed control 40 may be optionally connected.

With the foregoing specific description, the operation of this invention may now be explained.

A liquid containing dissolved solids which is desired to be concentrated which is indicated in FIGS. 6, 7 and 8 with reference character 41 is placed within container 14 as shown in FIG. 6. Switch 39 is turned on and the refrigerating means also turned on causing coil 15 to commence freezing the liquid 41 within container 14. At the same time motor 29 turns pulley 28 which in turn turns pulley 26 which in turn turns wheel 23 which in turn rotates member 21.

As the apparatus continues to operate ice, indicated by reference character 42 in FIGS. 7 and 8, forms within the bottom of container 14.

As ice 42 forms it exerts pressure upwardly on probe 22 and causes member 21 to move upwardly thereby causing wheel 23 to slide upwardly along shaft 25 in the direction of the arrows shown in FIG. 4. A film or very thin boundary layer of water is interposed between the knob 22 and the ice deposit 42. As is well known, water is a poor conductor and the lower edge of the water layer will be at freezing temperature while the opposite or upper part of the boundary layer is still in the liquid phase. Capillary action continuously draws the liquid under the probe or knob 22 as a portion of the layer is frozen, thereby replenishing that part of the liquid layer which is frozen. The probe is automatically moved to a new elevation. Viewed as a whole, the build-up of ice is quite gradual as is the elevation of the agitating means or stirrer. Through the freeze concentration process, the stirrer or agitator must be rotating continuously as the frictional heat at the knob 22 prevents the liquid in contact with the knob from solidifying even though the container is well below freezing.

Further operation of the apparatus causes the condition to be produced as shown in FIG. 8.

Finally, almost the entire liquid is frozen except for a small conical area of liquid which contains the concentration of the dissolved solids.

The supporting bearings 60 and 61 are formed of known materials having a low coefficient of friction. Free reciprocation of the stirrer shaft 21 through the bearings is a must as the freeze build-up takes place. The connecting link or wheel 23 is also formed of low friction plastic to permit it to freely slide relative to the drive rod 25 which is eccentric to the axis of rotation of the pulley 26.

The above description is also intended to cover the method of the instant invention which has been separately claimed herein.

The foregoing sets forth the manner in which the objects of this invention are achieved.

We claim:

1. A freeze concentrator comprising a container having a liquid to be concentrated therein by freezing during agitation thereof, means to cool said container and liquid contents to a temperature below the freezing point of said liquid, agitating means to stir said liquid continuously during freeze concentration, said agitating means including a stirrer shaft having knob means at the lower end thereof, said knob means being supported on said contents after freezing in said container, agitating arm means supported on said stirrer shaft and secured for rotation therewith, said agitating arm means being pivotally connected to said stirrer shaft adjacent said knob means to permit said arm means to fold upwardly and inwardly toward said shaft as said material freezes, and means to rotate said stirrer shaft while permitting free axial movement thereof as said liquid freezes and forces said knob means upwardly.

2. The freeze concentrator of claim 1 wherein said agitating means includes bearing means supported above said container, said bearing means receiving said stirrer shaft for free rotation and reciprocation therein, pulley means supported for rotation about said stirrer shaft, and means connecting said pulley means to said shaft to permit said pulley means to drive said shaft while permitting free axial movement thereof.

3. The freeze concentrator of claim 1 wherein said knob means is of generally spherical shape.

References Cited

UNITED STATES PATENTS

| 2,657,551 | 11/1953 | Toulmin | 62—124 |
| 2,849,868 | 9/1958 | Anderson | 62—342 |
| 3,108,449 | 10/1963 | Lents | 62—342 XR |
| 3,138,008 | 6/1964 | Thompson | 62—342 XR |
| 3,323,320 | 6/1967 | Conz | 62—342 XR |
| 3,328,972 | 7/1967 | Svanoe | 62—123 |
| 3,333,436 | 8/1967 | Johnson et al. | 62—123 |
| 3,347,058 | 10/1967 | Svanoe | 62—123 XR |

NORMAN YUDKOFF, Primary Examiner

U.S. Cl. X.R.

62—58, 342